United States Patent
Taylor et al.

(10) Patent No.: US 10,697,302 B2
(45) Date of Patent: Jun. 30, 2020

(54) COMPRESSOR AEROFOIL MEMBER

(71) Applicant: ROLLS-ROYCE plc, London (GB)

(72) Inventors: James V. Taylor, Derby (GB); Robert J. Miller, Derby (GB)

(73) Assignee: Rolls-Royce plc, London (GB)

( * ) Notice: Subject to any disclaimer, the term of this patent is extended or adjusted under 35 U.S.C. 154(b) by 110 days.

(21) Appl. No.: 15/978,556

(22) Filed: May 14, 2018

(65) Prior Publication Data
US 2018/0335044 A1  Nov. 22, 2018

(30) Foreign Application Priority Data
May 16, 2017  (GB) .................................. 1707811.4

(51) Int. Cl.
*F01D 5/14* (2006.01)
*F04D 29/32* (2006.01)

(52) U.S. Cl.
CPC ............ *F01D 5/141* (2013.01); *F01D 5/142* (2013.01); *F01D 5/145* (2013.01); *F04D 29/324* (2013.01);
(Continued)

(58) Field of Classification Search
CPC .... F04D 29/324; F04D 29/242; F04D 29/544; F01D 5/142; F01D 5/141; F05D 2220/32;
(Continued)

(56) References Cited

U.S. PATENT DOCUMENTS

| | | | |
|---|---|---|---|
| 3,745,629 A | * | 7/1973 | Pask .......................... F01D 5/16 29/889.22 |
| 4,585,395 A | | 4/1986 | Nourse et al. |

(Continued)

FOREIGN PATENT DOCUMENTS

| | | |
|---|---|---|
| EP | 1939399 | 7/2008 |
| EP | 2775097 | 9/2014 |
| WO | 2015126798 | 8/2015 |

OTHER PUBLICATIONS

Taylor, et al., "Competing 3D Mechanisms in Compressor Flows," ASME Turbo Expo 2015: Turbine Technical Conference and Exposition, 2015.
(Continued)

*Primary Examiner* — Richard A Edgar
*Assistant Examiner* — Maranatha Boardman
(74) *Attorney, Agent, or Firm* — Simpson & Simpson, PLLC

(57) ABSTRACT

An aerofoil member that extends between radially inner and radially outer endwalls which define a gas annulus of the compressor. Aerofoil member has a leading edge, a trailing edge, a pressure surface and a suction surface such that successive cross-sections through the aerofoil member transverse to the radial direction provide respective aerofoil sections. The external shape of the aerofoil member is defined by the stacking of the aerofoil sections on a stacking axis which passes through a reference point common to each aerofoil section. The aerofoil member has lean produced by the projection of the stacking axis onto a plane normal to the engine axis intersecting a first one of the endwalls at an angle of from 5° to 25° to the circumferential direction direction such that the pressure surface faces the first endwall.

10 Claims, 7 Drawing Sheets

(52) U.S. Cl.
CPC .......... *F01D 5/148* (2013.01); *F05D 2220/32* (2013.01); *F05D 2240/301* (2013.01); *F05D 2250/711* (2013.01); *F05D 2250/713* (2013.01)

(58) Field of Classification Search
CPC ......... F05D 2240/301; F05D 2250/711; F05D 2250/713
See application file for complete search history.

(56) References Cited

U.S. PATENT DOCUMENTS

| | | | |
|---|---|---|---|
| 7,121,792 B1 * | 10/2006 | Fessou | F01D 5/141 415/191 |
| 2003/0086788 A1 | 5/2003 | Chandraker | |

OTHER PUBLICATIONS

Great Britain Search Report dated Oct. 25, 2017, issued in GB Patent Application No. 1707811.4.

* cited by examiner (a) (b)

(a) (b)

COMPRESSOR AEROFOIL MEMBER

CROSS-REFERENCE TO RELATED APPLICATIONS

This specification is based upon and claims the benefit of priority from UK Patent Application Number 1707811.4 filed on 16 May 2017, the entire contents of which are incorporated herein by reference.

BACKGROUND

1. Field of the Disclosure

The present disclosure relates to an aerofoil member for a compressor of a gas turbine engine.

2. Description of the Related Art

Each aerofoil member (i.e. rotor blade or stator vane) of a gas turbine engine has a leading edge, a trailing edge, a pressure surface and a suction surface, whereby cross-sections through such an aerofoil member transverse to the radial direction provide respective aerofoil sections. Typically the leading and trailing edges of the aerofoil members are not straight lines.

Features of the geometry of an aerofoil member can be defined by the stacking of the aerofoil sections. For example, the "lean" and the "sweep" of an aerofoil member are defined with reference to the locus of a stacking axis which passes through a common point of each aerofoil section (the common point may be the leading edge, trailing edge or the centroid of each aerofoil section). "Lean" is the displacement, with distance from an endwall, of the stacking axis in a circumferential direction (origin the turbine axis) relative to the position of the stacking axis at the endwall. Similarly, "sweep" is the upstream or downstream displacement, with distance from an endwall, of the stacking axis relative to its position at the endwall. The "chord" of an aerofoil section is the straight line connecting the leading edge and the trailing edge at the section, and the "chordal length" of an aerofoil section is the length of that line.

FIG. 1 shows schematically a view from the pressure surface side of an aerofoil member of a gas turbine engine compressor, the leading edge of the member being to the left and the trailing edge to the right. Superimposed on the pressure surface are contours of the transverse pressure gradient $\partial P/\partial n$ on that surface, where P is the static pressure and n is distance over the pressure surface directed away from the bottom endwall (thus in an axial compressor with parallel endwalls $\partial P/\partial n$ is $\partial P/\partial r$, where r is the radial direction). Also shown in FIG. 1 are the streamlines over a selected rectangular portion of the pressure surface, with the velocity components in then and s directions of the boundary layer at that portion (s being distance over the pressure surface in the direction normal to n).

It is possible for the low momentum layers of the boundary layer to flow in the transverse direction out of the plane of the freestream direction, the rate of this flow being controlled by the pressure gradient $\partial P/\partial n$. In FIG. 1, the strength of this transverse flow is indicated by the relative sizes of the arrows on the pressure surface of the aerofoil member.

The strength of $\partial P/\partial n$ can be controlled with the stacking of the aerofoil sections of the aerofoil member. Greater lean or sweep increases $\partial P/\partial n$ and drives more transverse boundary layer flow.

Thus ASME paper GT2015-43322 explains that increasing $\partial P/\partial n$ reduces streamline curvature in the corner flow region of the aerofoil member. This reduction in turn decreases loss and improves stability by preventing or delaying the onset of open corner separations. This effect is illustrated in FIG. 2, which show computational fluid dynamic (CFD) streamlines adjacent an endwall on the pressure surface of (a) an aerofoil member with 6° lean, and (b) an aerofoil member with 34° lean.

However, increasing $\partial P/\partial n$ also increases streamline contraction in the midspan region. This contraction degrades the blade boundary layer, increasing profile loss and triggering the onset of trailing edge separation. This effect is illustrated in FIG. 3, which show CFD streamlines at midspan on the pressure surface of (a) the aerofoil member with 6° lean, and (b) the aerofoil member with 34° lean.

FIG. 4 shows conventional "circular", "parabolic" and "end stack" lean or sweep stacking axis profiles. Such stacking axis profiles drive boundary layer transverse flow towards the midspan, as shown schematically by the arrows superimposed on the profiles of FIG. 4. Particularly when the parabolic or circular profiles are applied, this flow is driven towards the middle over the whole span. The magnitude of the transverse flow is proportional to the gradient of the stacking profile.

Thus it is possible to trade the performance of the corner flow with that of the midspan, and end stacking in particular allows some decoupling of the two regions of the flow. However, a flow problem lying originally in the midspan region cannot be improved by conventional stacking.

SUMMARY

In a first aspect, the present disclosure provides an aerofoil member for a compressor of a gas turbine engine, in use the aerofoil member extending between radially inner and radially outer endwalls which define a gas annulus of the compressor;
  wherein the aerofoil member has a leading edge, a trailing edge, a pressure surface and a suction surface such that successive cross-sections through the aerofoil member transverse to the radial direction provide respective aerofoil sections, and wherein the external shape of the aerofoil member is defined by the stacking of the aerofoil sections on a stacking axis which passes through a reference point common to each aerofoil section;
  wherein the aerofoil member has lean produced by the projection of the stacking axis onto a plane normal to the engine axis intersecting a first one of the endwalls at an angle of from 5° to 25° to the circumferential direction such that the pressure surface faces the first endwall; and
  wherein with increasing distance along the stacking axis from the first endwall, the stacking axis experiences a turning point such that the pressure surface has a convex shape adjacent the first endwall.

For the avoidance of doubt, by a "turning point" is meant a local maximum or minimum in a quantity. Thus, at a turning point, the gradient of the quantity is zero. From a position at the turning point, the quantity either increases in both directions (for a local minimum) or decreases in both directions (for a local maximum).

By forming the aerofoil member in this way, the decoupling of midspan and endwall regions of flow can be improved. It is also possible to take better advantage of an endwall region stabilizing against corner separation to redistribute low momentum transverse flow across a surface of the member. For example, it is possible to tailor the quantity of transverse flow at each location on the span.

If the stacking axis is confined to a single plane normal to the engine axis, then the projection of the stacking axis onto the normal plane is simply the locus of the stacking axis. However, more generally the stacking axis may not be confined to a single plane normal to the engine axis, such that the stacking axis produces sweep as well as lean.

In a second aspect, the present invention provides a compressor of a gas turbine engine having a circumferential row of aerofoil members according to any one of the previous claims, the aerofoil members extending between radially inner and radially outer endwalls which define a gas annulus of the compressor.

In a third aspect, the present disclosure provides a gas turbine engine having the compressor of the second aspect.

Optional features of the present disclosure will now be set out. These are applicable singly or in any combination with any aspect of the present disclosure.

The aerofoil member can be a rotor blade or a stator vane.

The common reference point may be, for example, the leading edge, the trailing edge or the centroid of each aerofoil section.

The projection of the stacking axis may intersect the first endwall at an angle of from 10° to 20° to the circumferential direction.

The turning point may be at a radial distance of more than 0.05 R, and preferably of more than 0.1 R, from the first endwall, where R is the radial distance between the endwalls.

The turning point may be at a radial distance of less than 0.3 R, and preferably of less than 0.2 R, from the first endwall, where R is the radial distance between the endwalls.

The aerofoil member may have further lean produced by the projection of the stacking axis intersecting the second one of the endwalls at an angle of from 5° to 25° to the circumferential direction such that the pressure surface faces the second endwall. With increasing distance along the stacking axis from the second endwall, the stacking axis may then experience a further turning point such that the pressure surface has a convex shape adjacent the second endwall. When the aerofoil member has the first and the further (i.e. second) turning point, this produces a third turning point in the stacking axis between the first and second turning points, the third turning point being of the opposite sense to the first and second turning points. The projection of the stacking axis may intersect the second endwall at an angle of from 10° to 20° to the circumferential direction. The further turning point may be at a radial distance of more than 0.05 R, and preferably of more than 0.1 R, from the second endwall, where R is the radial distance between the endwalls. The further turning point may be at a radial distance of less than 0.3 R, and preferably of less than 0.2 R, from the second endwall, where R is the radial distance between the endwalls.

BRIEF DESCRIPTION OF THE DRAWINGS

Embodiments of the present disclosure will now be described by way of example with reference to the accompanying drawings in which.

DETAILED DESCRIPTION OF THE DISCLOSURE

Figure 1:
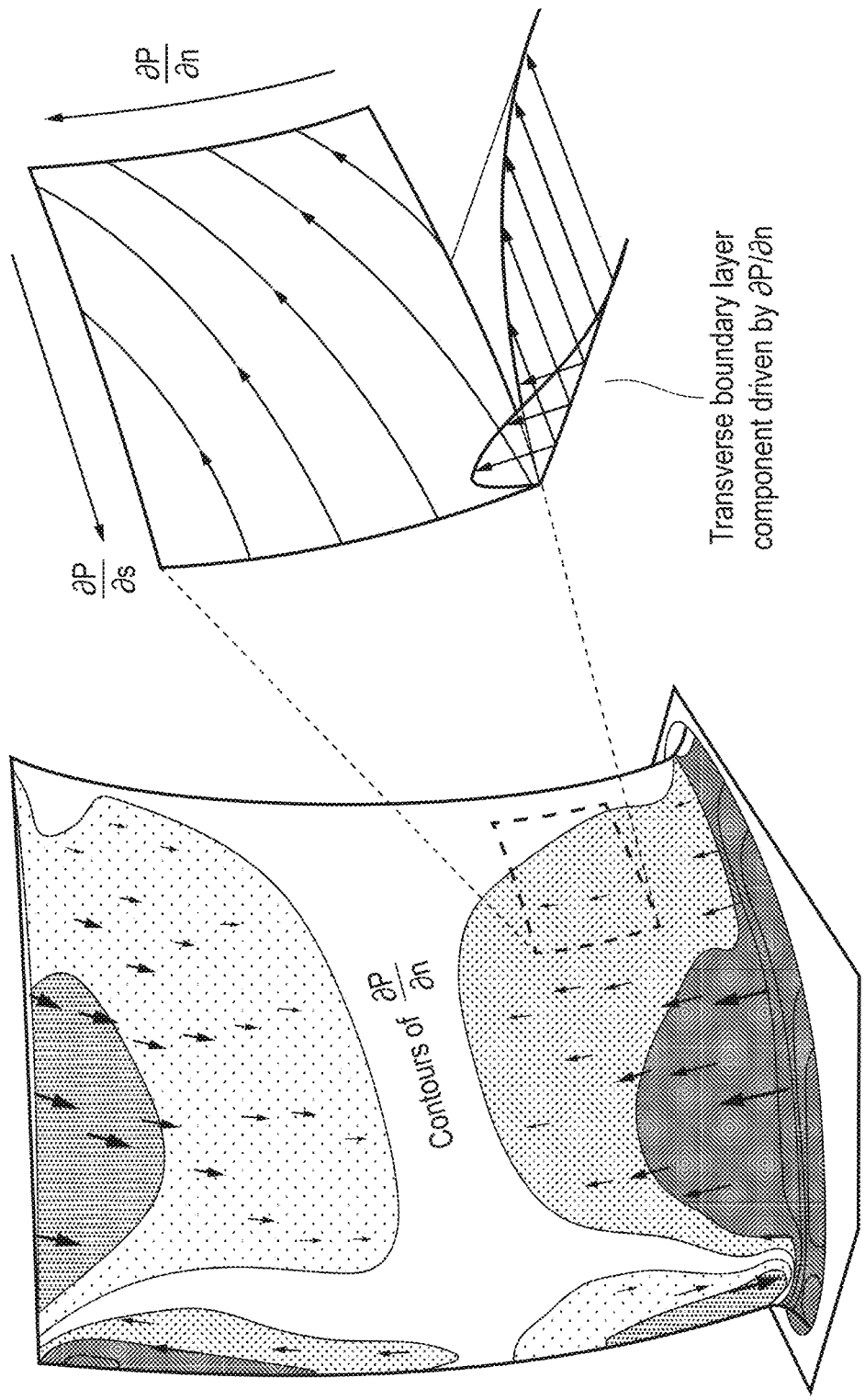
FIG. 1 shows schematically a view from the pressure surface side of an aerofoil member of a gas turbine engine compressor.
Figure 2:
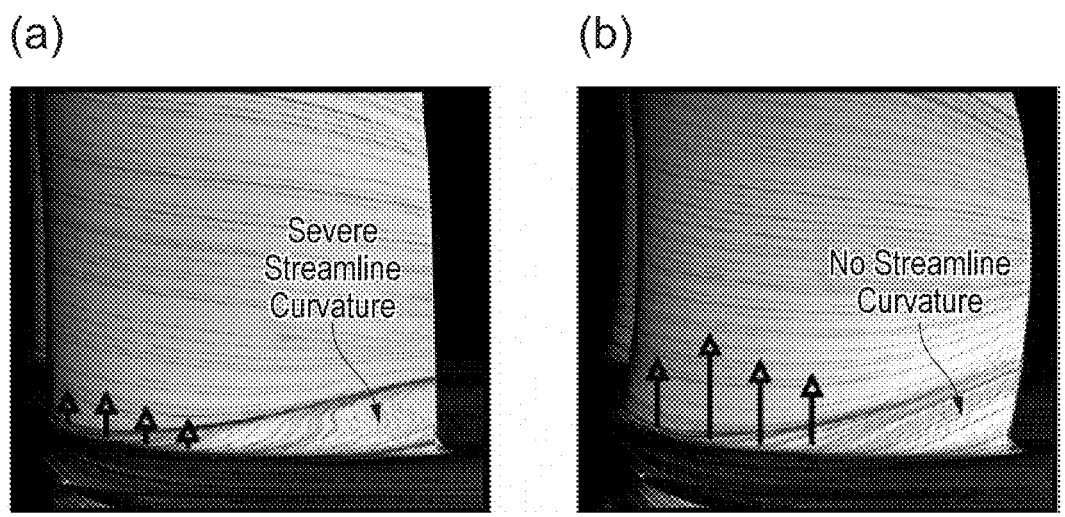
FIG. 2 shows CFD streamlines adjacent an endwall on the pressure surface of (a) an aerofoil member with 6° lean, and (b) an aerofoil member with 34° lean.
Figure 3:
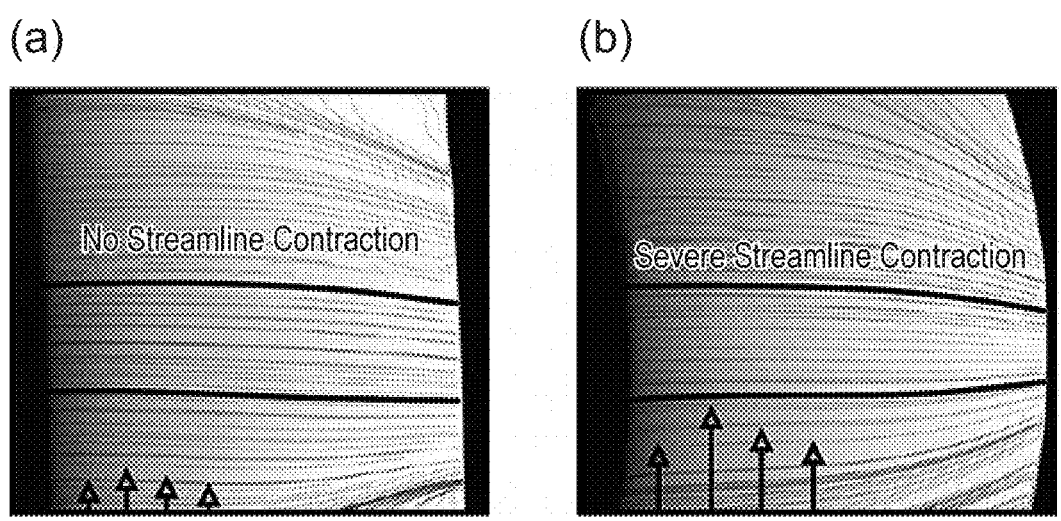
FIG. 3 shows CFD streamlines at midspan on the pressure surface of (a) the aerofoil member with 6° lean, and (b) the aerofoil member with 34° lean.
Figure 4:
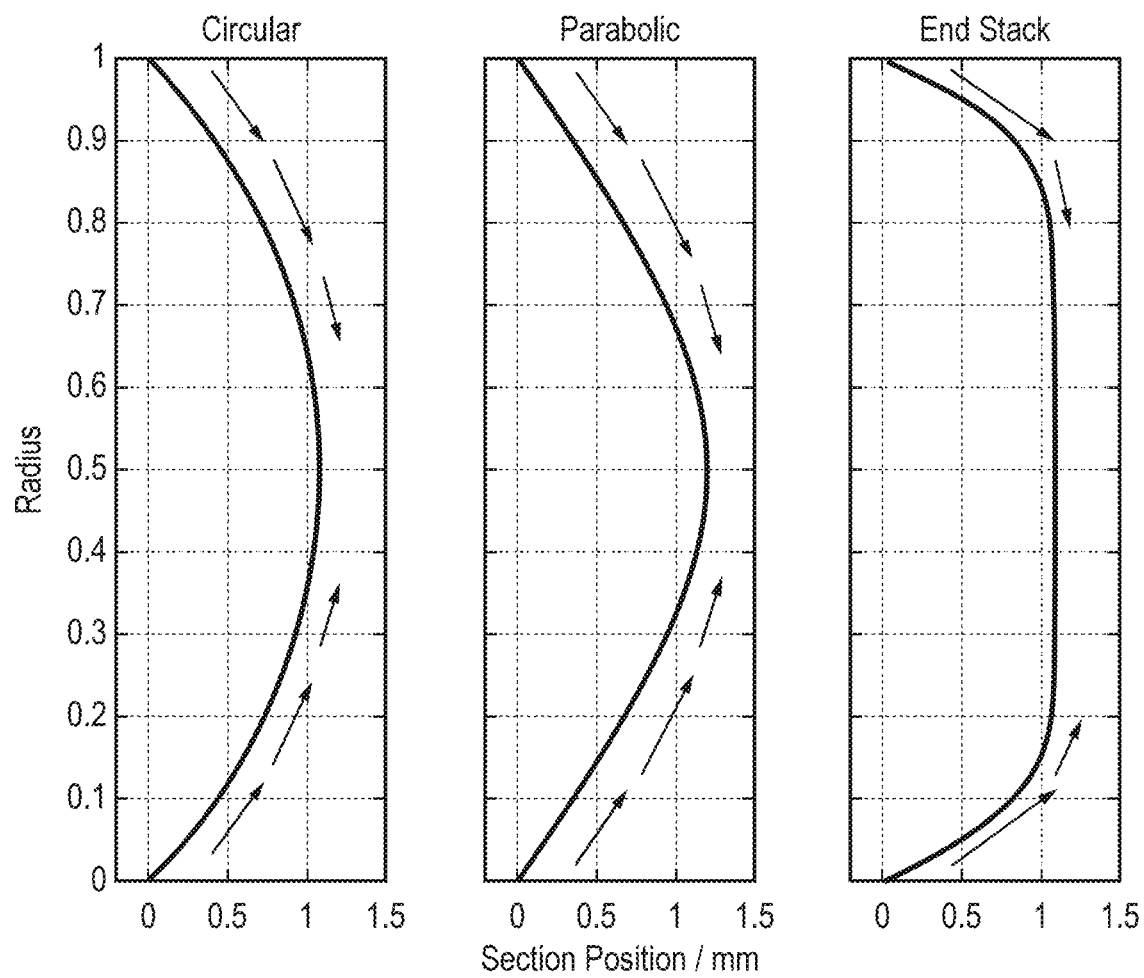
FIG. 4 shows conventional "circular", "parabolic" and "end stack" lean or sweep stacking axes.
Figure 5:
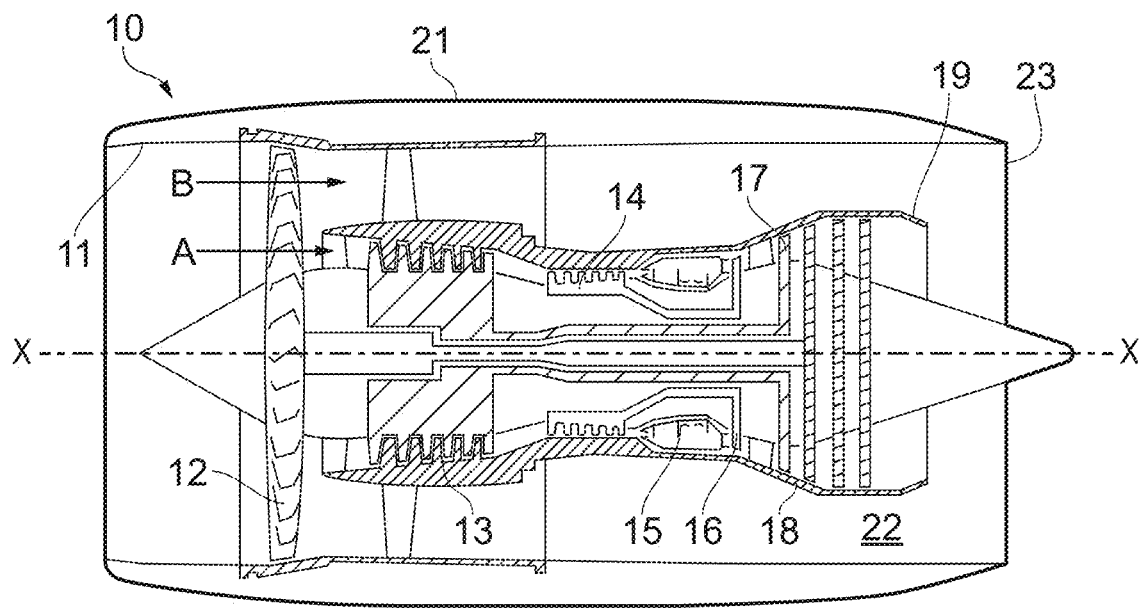
FIG. 5 shows a longitudinal cross-section through a ducted fan gas turbine engine.

With reference to FIG. 5, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 6:
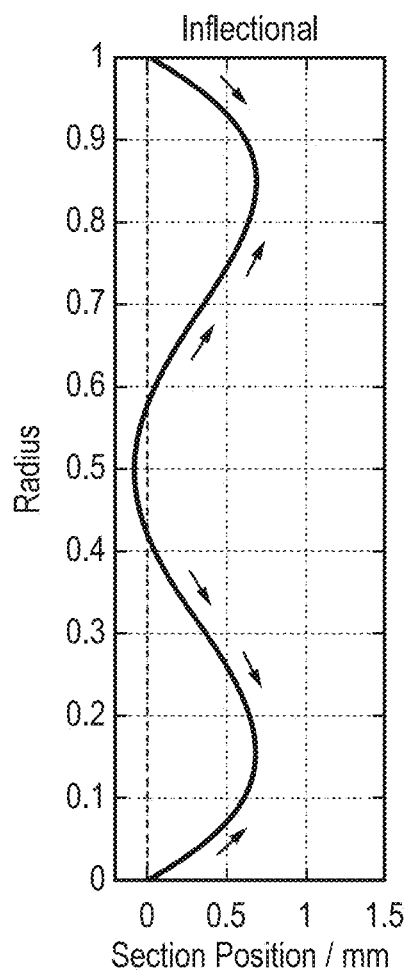
FIG. 6 shows an "inflectional" stacking axis profile.

The intermediate pressure compressor 13 and the high-pressure compressor 14 provide a series of compressor stages, each made up of a circumferential row of rotor blades and an adjacent circumferential row of stator vanes. These blades and vanes are aerofoil members which can benefit from an "inflectional" stacking axis profile, i.e. in which each blade or vane of any given row has a stacking axis, the projection of which onto a plane normal to the engine axis intersects at least one of the radially inner and radially outer endwalls of the compressor at an angle of from 5° to 25° (preferably from 10° to 20°) to the circumferential direction such that its pressure surface faces that endwall, and the projection of which, with increasing distance along the stacking axis from that endwall, experiences a turning point such that its pressure surface has a convex shape adjacent the endwall. FIG. 6 shows an inflectional stacking axis profile of this kind in which there is a turning point and convex shape at both endwalls, the profile being the projection of the stacking axis onto a plane normal to the engine axis. The arrows superimposed on the profile show the directions of boundary layer transverse flow driven by the profile.

By means of the inflectional stacking axis profile, it is possible to tailor the quantity of transverse flow at each location on the span. In the profile of FIG. 6, designed for use with a shrouded stator vane, the flow is driven towards locations at about 15% and 85% span.

At least three benefits follow from the use of the inflectional stacking profile:
1. Close to the endwalls, flow is driven towards midspan at a high rate. This reduces the streamline curvature and improves the corner flow.
2. At midspan the flow is driven out towards the endwalls. This counteracts the blockage from the corner separations and results in zero streamline contraction, which is the optimal condition for blade boundary layer flow.
3. The low streamwise momentum flow close to the vane surface is concentrated at the two separation lines or "lift-off-lines" (see FIG. 8(b)) which describe the corner separations. Here it is pulled off the vane into the freestream by the collision of these two parts of the vane boundary layer. This stabilizes the operation of the vane at high incidence.

The inflectional stacking axis profile can be used on rotor blades and/or stator vanes. Additionally or alternatively, it can be used in a shrouded or unshrouded configuration. It does not need to be symmetric, but can be applied to aerofoil members at just one end, which can be an end with a blade tip gap or a fixed end.

When the inflectional stacking axis profile has turning points at both ends this produces a third turning point of opposite sense at midspan. As shown in FIG. 6, the midspan offset can then be to the opposite side of the line (dashed in FIG. 6) connecting the points of intersection of the stacking axis profile with the endwalls. Alternatively, the midspan offset can be to the same side of this line. In other words, the displacement of the midspan sections can be positive or negative in the circumferential direction depending on the magnitude of the maximum or minimum of the third turning point.

Figure 7:
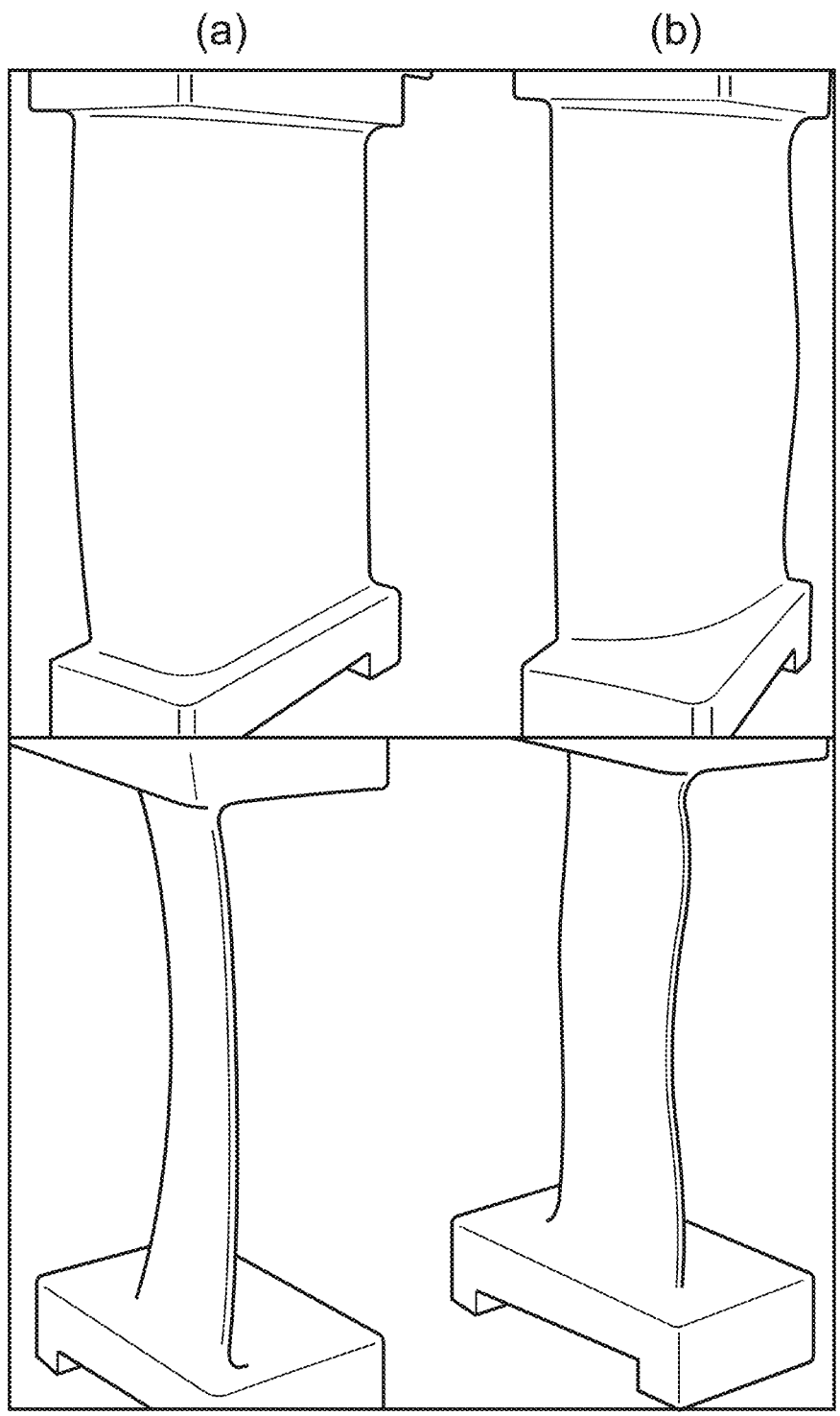
FIG. 7 shows (a) at top a view from the leading edge and at bottom a view from the trailing edge of the suction surface of a shrouded stator vane having a parabolic stacking profile, and (b) at top a view from the leading edge and at bottom a view from the trailing edge of the suction surface of a modified version of the stator vane having an inflectional stacking profile.

FIG. 7 shows (a) at top a view from the leading edge and at bottom a view from the trailing edge of the suction surface of a shrouded stator vane having a parabolic stacking profile, and (b) at top a view from the leading edge and at bottom a view from the trailing edge of the suction surface of a modified version of the stator vane having an inflectional stacking profile.

Figure 8:
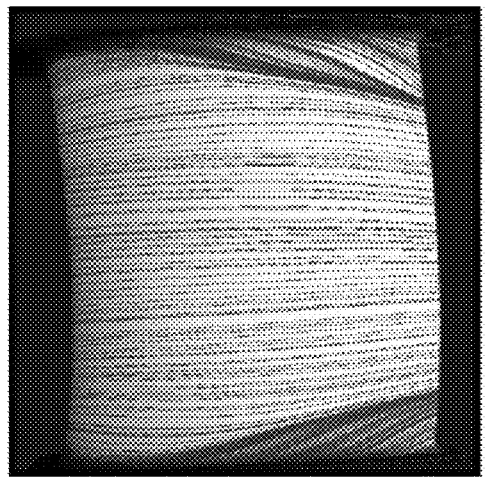
FIG. 8 shows suction surface streamlines at the engine design point for (a) the parabolic vane of FIG. 7, and (b) the inflectional vane of FIG. 7.
Figure 8:
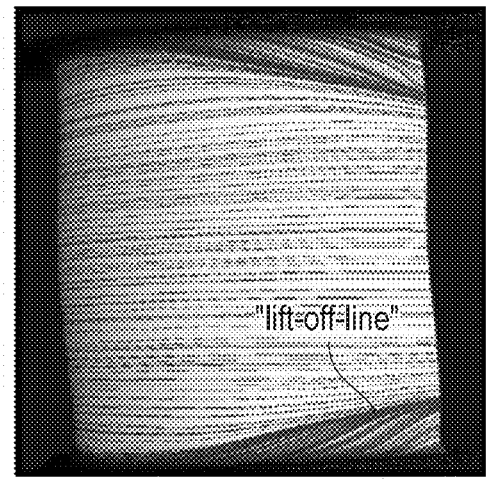
Figure 9:
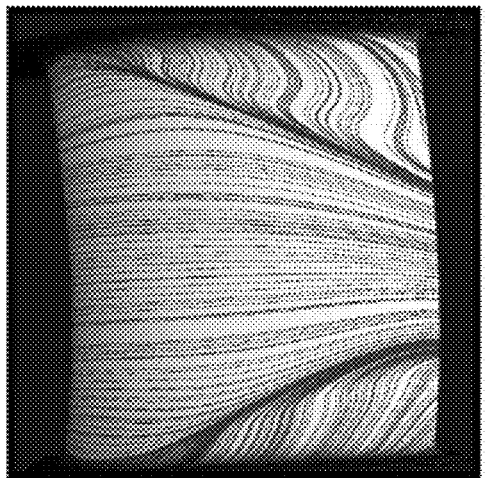
FIG. 9 shows suction surface streamlines at a near stall operating condition of the engine for (a) the parabolic vane of FIG. 7, and (b) the inflectional vane of FIG. 7.
Figure 9:
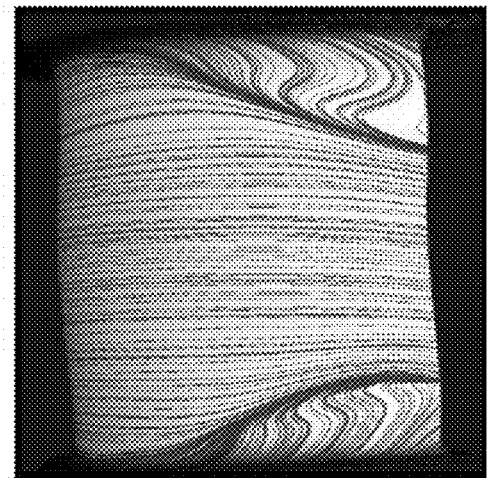

FIG. 8 shows suction surface streamlines at the engine design point for (a) the parabolic vane of FIG. 7, and (b) the inflectional vane of FIG. 7. The inflectional profile reduces corner and suction surface losses. FIG. 9 shows suction surface streamlines at a near stall operating condition of the engine for (a) the parabolic vane of FIG. 7, and (b) the inflectional vane of FIG. 7. The inflectional profile improves corner and suction surface stability.

Figure 10:
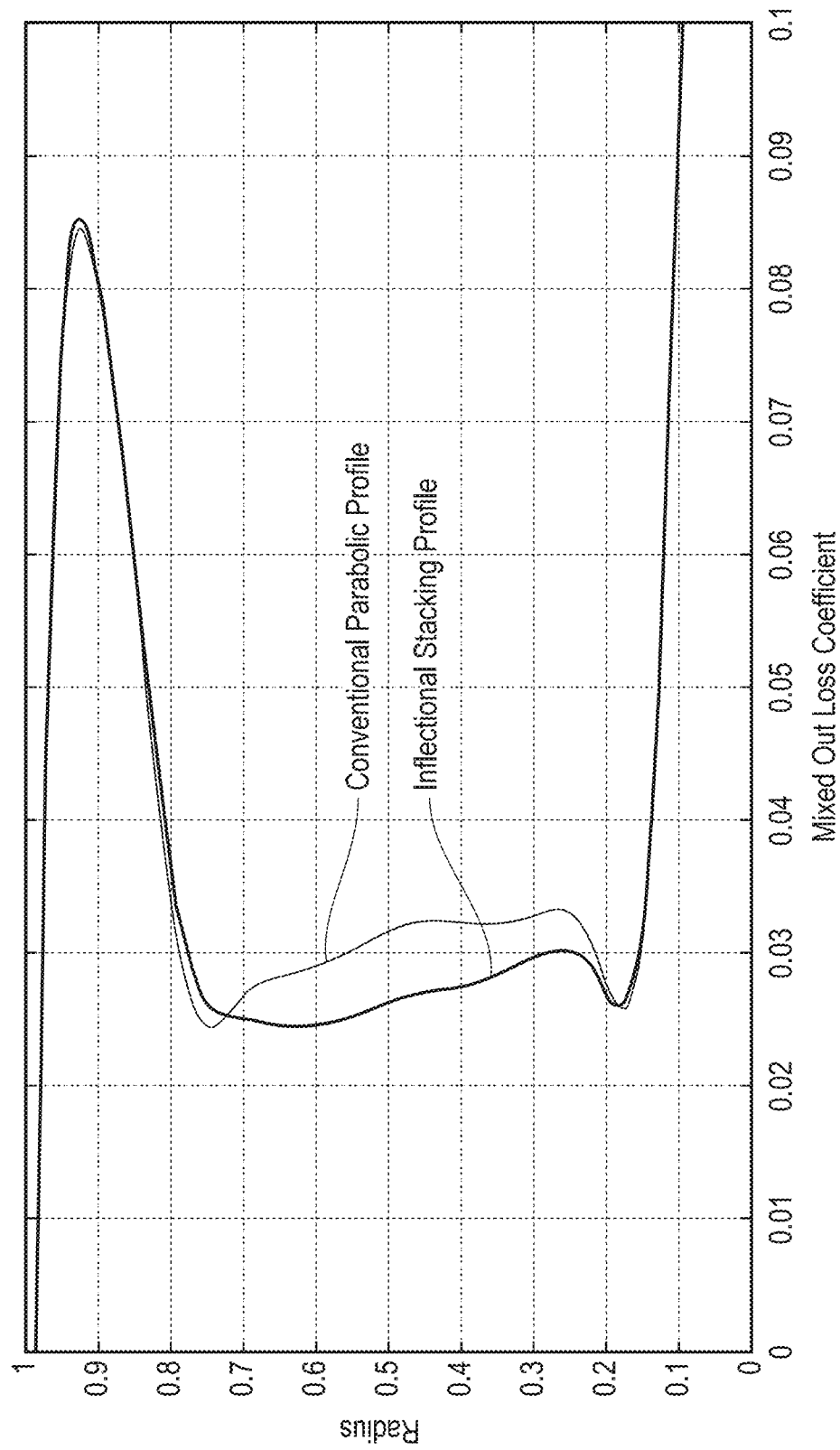
FIG. 10 shows the radial distribution of loss coefficient for two shrouded stator vanes, one with a conventional parabolic stacking profile and one with the inflectional stacking profile.

FIG. 10 shows the radial distribution of loss coefficient for two shrouded stator vanes, one with a conventional parabolic stacking profile and one with the inflectional stacking profile. The loss coefficient is calculated from the mixed out values of stagnation pressure at exit from the shrouded stator vane. It can be seen that the inflectional profile maintains the same value of endwall loss as the parabolic stacking profile, but is able to significantly reduce the midspan profile loss. It achieves this benefit by reducing the streamline contraction to zero.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

All references cited above are hereby incorporated by reference.

We claim:

1. An aerofoil member for a compressor of a gas turbine engine, the aerofoil member extending between radially inner and radially outer endwalls which define a gas annulus of the compressor;
   wherein the aerofoil member has a leading edge, a trailing edge, a pressure surface and a suction surface such that successive cross-sections through the aerofoil member transverse to the radial direction provide respective aerofoil sections, and wherein the external shape of the aerofoil member is defined by the stacking of the aerofoil sections on a stacking axis which passes through a reference point common to each aerofoil section;
   wherein the aerofoil member has lean produced by the projection of the stacking axis onto a plane normal to the engine axis intersecting a first one of the endwalls at an angle of from 5° to 25° to the circumferential direction such that the pressure surface faces the first endwall; and
   wherein with increasing distance along the stacking axis from the first endwall, the stacking axis experiences a turning point such that the pressure surface has a convex shape adjacent the first endwall.

2. The aerofoil member according to claim 1, wherein the projection of the stacking axis intersects the first endwall at an angle of from 10° to 20° to the circumferential direction.

3. The aerofoil member according to claim 1, wherein the turning point is at a radial distance of more than 0.05 R from the first endwall, where R is the radial distance between the endwalls.

4. The aerofoil member according to claim 1, wherein the turning point is at a radial distance of less than 0.3 R from the first endwall, where R is the radial distance between the endwalls.

5. The aerofoil member according to claim 1, wherein the aerofoil member has further lean produced by the projection of the stacking axis intersecting the second one of the endwalls at an angle of from 5° to 25° to the circumferential direction such that the pressure surface faces the second endwall; and wherein with increasing distance along the stacking axis from the second endwall, the stacking axis experiences a further turning point such that the pressure surface has a convex shape adjacent the second endwall.

6. The aerofoil member according to claim 5, wherein the projection of the stacking axis intersects the second endwall at an angle of from 10° to 20° to the circumferential direction.

7. The aerofoil member according to claim 5, wherein the further turning point is at a radial distance of more than 0.05 R from the second endwall, where R is the radial distance between the endwalls.

8. The aerofoil member according to claim 5, wherein the further turning point is at a radial distance of less than 0.3 R from the second endwall, where R is the radial distance between the endwalls.

9. A compressor of a gas turbine engine having a circumferential row of the aerofoil members according to claim 1, the aerofoil members extending between the radially inner and radially outer endwalls which define the gas annulus of the compressor.

10. A gas turbine engine having the compressor according to claim 9.

* * * * *